J. H. WAGENHORST.
VEHICLE WHEEL RIM.
APPLICATION FILED AUG. 9, 1912.
1,231,314. Patented June 26, 1917.
2 SHEETS—SHEET 1.
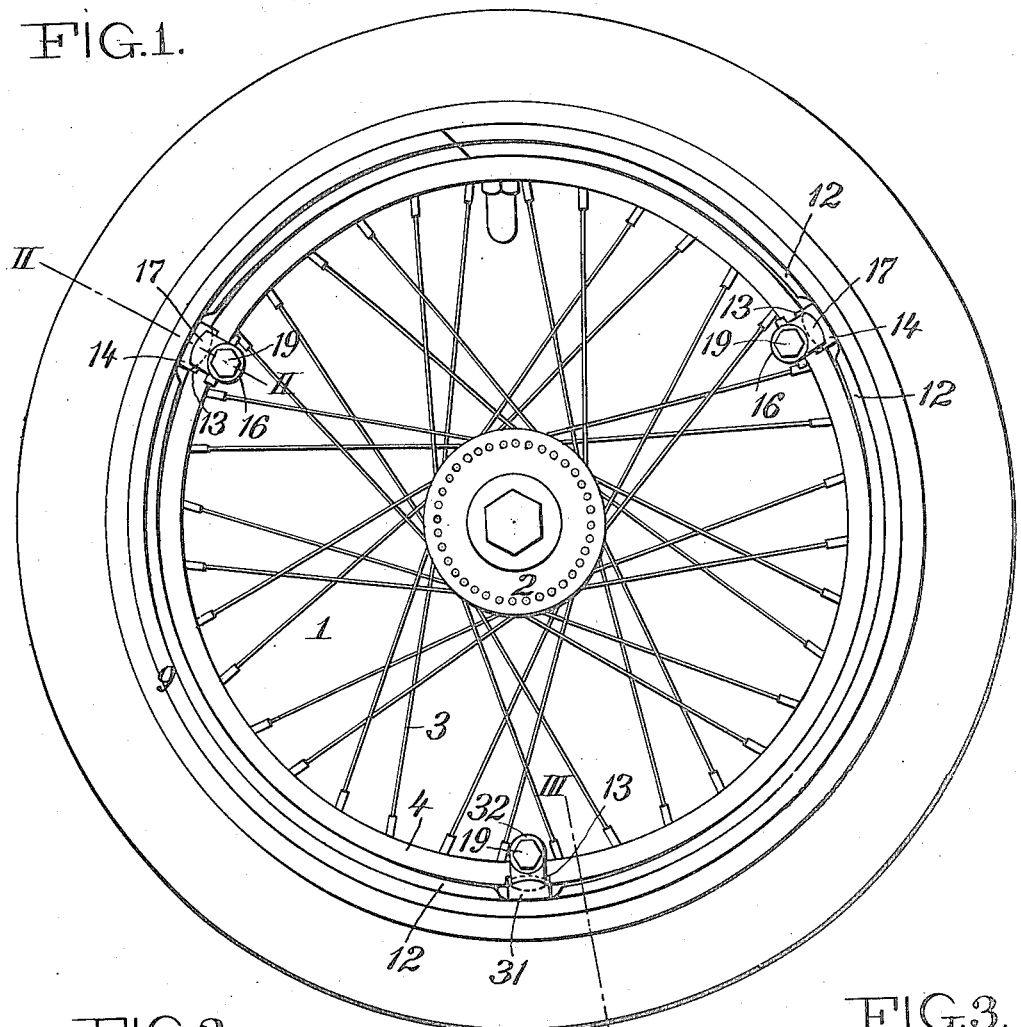
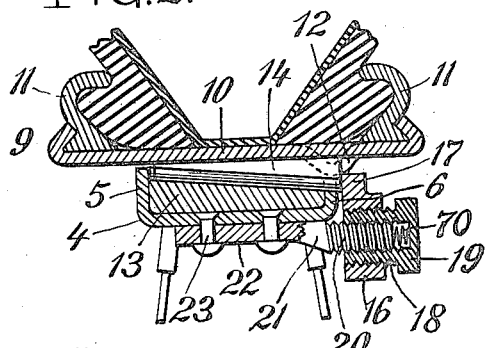
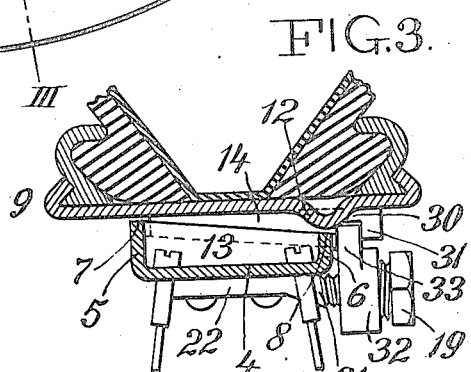

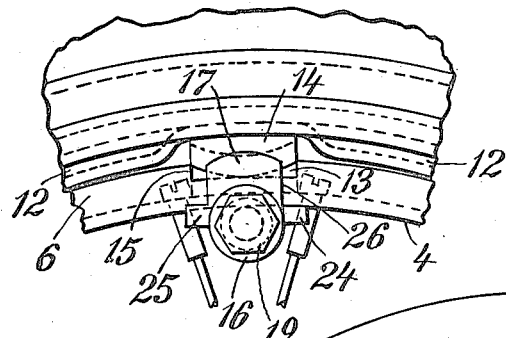
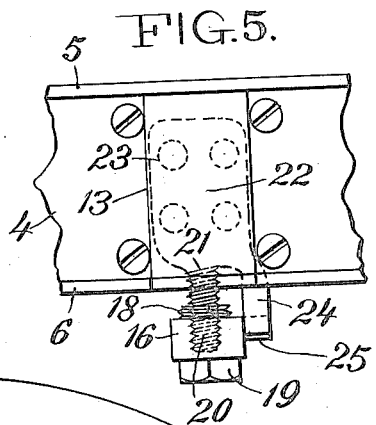
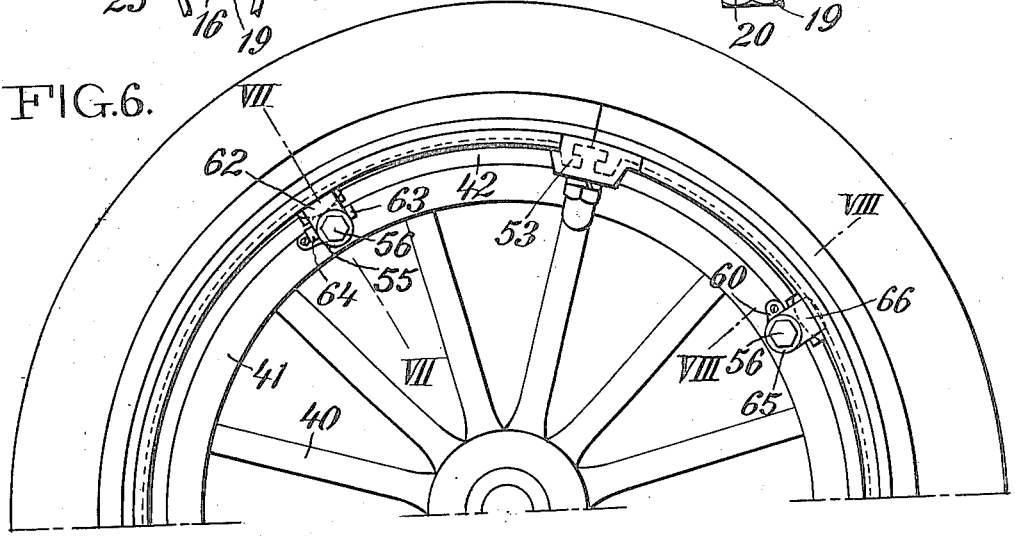
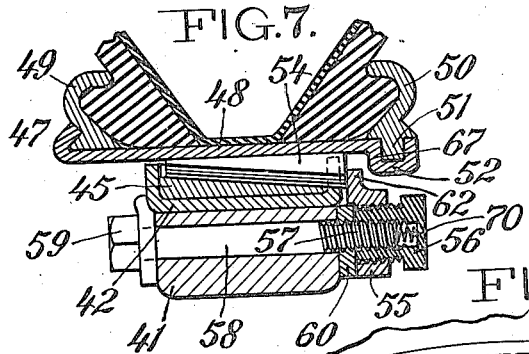
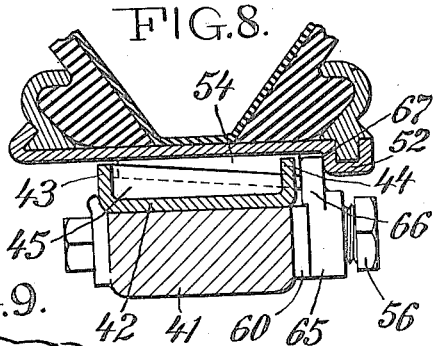
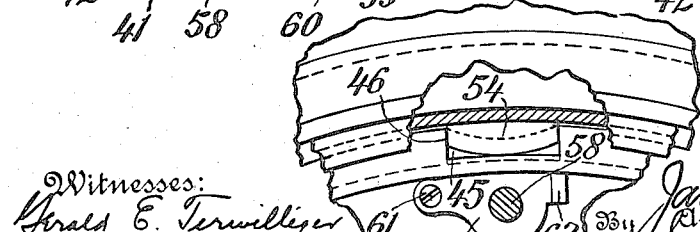

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,231,314.

Specification of Letters Patent. Patented June 26, 1917.

Application filed August 9, 1912. Serial No. 714,150.

*To all whom it may concern:*

Be it known that I, JAMES H. WAGENHORST, a citizen of the United States, residing in the city of Akron, county of Summit and State of Ohio, have invented certain new and useful Improvements in Vehicle-Wheel Rims, of which the following is a specification.

This invention relates to improvements in vehicle wheel rims of the class known as demountable, in which a rim for holding a pneumatic or other resilient tire is removably mounted upon a vehicle wheel. In structures of this class the tire-carrying rim, upon which is a tire, may be removed and replaced by a duplicate rim carrying another tire. It is thus possible to make an exchange of tires without the necessity for detaching the resilient tire from the tire-carrying rim or placing the new one upon such rim, and in case of an accident while on the road a necessary change of tires is greatly facilitated. It is possible to carry extra tire-carrying rims with fully inflated pneumatic tires upon them, so that upon placing a new tire upon the wheel it is not even necessary to inflate the same. In accordance with my present invention I provide improved means for securing the tire-carrying rim upon the wheel, the nature and objects of my improvements being fully set forth in the following detailed description.

In the accompanying drawings which form a part of this specification, Figure 1 is a side elevation of a vehicle wheel provided with a rim embodying a preferred form of my invention; Fig. 2 is a transverse section on the line II—II of Fig. 1; Fig. 3 is a transverse section on the line III—III of Fig. 1; Fig. 4 is a side elevation of a portion of the fixed rim and demountable rim shown in Fig. 1 illustrating one of the locking devices; Fig. 5 is a plan view of the portion of the fixed rim and locking device shown in Fig. 4, the tire-carrying rim being removed; Fig. 6 is a side elevation of a portion of a vehicle wheel and rim illustrating a modified form of my invention; Fig. 7 is a section on line VII—VII of Fig. 6; Fig. 8 is a section on line VIII—VIII of Fig. 6; Fig. 9 is a side elevation of a portion of the wheel felly and rim shown in Fig. 6, a part of the rim and locking device being broken away.

Referring to the drawings in detail and particularly to Figs. 1 to 5, inclusive, the numeral 1 designates a vehicle wheel which has been shown for purposes of illustration as comprising a hub 2, wire spokes 3 and a metallic substantially U-shaped channel 4, constituting a felly member or fixed rim. The channel 4 is provided with legs 5 and 6, the leg 6 being of less height than the leg 5 so as to provide bearing surfaces 7 and 8 of unequal diameter formed by the peripheries of the legs. 9 is the tire-carrying rim which may be of any suitable construction, but which is shown for purposes of illustration as comprising a transversely split base 10 carrying the endless reversible tire-retaining flanges 11. At one side, the rim base 10 seats directly upon the bearing surface 7 of greater diameter, while near the other side, the rim base has rolled in it a series of ribs 12 which seat upon the bearing surface 8 of smaller diameter. By providing the bearing surfaces at the two sides of the wheel of different diameters it will be understood that the removal of the tire-carrying rim is greatly facilitated. A slight lateral movement of the rim will cause the ridges 12 to clear the bearing surface 8, when the rim can be readily tilted sufficiently to permit the valve stem to be withdrawn from its hole through the fixed rim or felly member. The portions of the tire-carrying rim which are designed to engage the bearing surfaces 7 and 8 upon the wheel felly are made of very slightly greater diameter than such bearing surfaces, means being provided for distorting the rim sufficiently to cause the same to grip the bearing surfaces of the wheel throughout the greater portion of the circumference thereof. This is accomplished by forcing the rim away from the wheel at intervals, as shown in Fig. 1. For accomplishing this result I secure in the channel 4 a series of blocks 13, these blocks having wedging surfaces inclined transversely from the side adjacent to the lower leg 6 toward the higher leg 5. The tire-carrying rim has secured to its under-surface a corresponding series of blocks 14 having similarly inclined surfaces adapted to be wedged upon the blocks 13 by lateral movement of the tire-carrying rim. The wedging engagement of these blocks lifts the rim away from the wheel adjacent thereto and thus causes the rim to grip the bearing surfaces 7 and 8 between adjacent pairs of blocks. These blocks are preferably used also to prevent creeping of the rim upon the wheel, and for this purpose are made to interlock. For example, the wedging surfaces of the blocks 13 may be made concave, as shown in Figs. 1 and 4, the blocks 14 having correspondingly shaped convex surfaces. As shown in Fig. 4, the leg 6 of the channel is notched opposite to each pair of blocks, as indicated at 15, so as to permit a free engagement of the wedging surfaces of the blocks. As shown in Figs. 1 and 4, the blocks 14 are located between the adjacent ends of the ribs 12. Any suitable number of the blocks or wedges 13 and 14 may be used. For example, in Fig. 1 I have shown the wheel and rim provided with three pairs of the blocks spaced at equal intervals about the circumference.

Any suitable means may be provided for forcing the rim laterally upon the wheel so as to cause the blocks 14 to wedge upon the blocks 13 and to retain the rim against lateral removal from the wheel. In the drawings I have shown for this purpose a modification of the rim locking means described and claimed broadly in my application Serial Number 589,680. The locking devices are preferably located opposite to the blocks or wedges, although this arrangement is not absolutely necessary and may in some cases be departed from. As shown, however, I provide opposite two of the pairs of wedges locking devices of the character clearly illustrated in Figs 2, 4 and 5. These devices comprise eccentric keepers 16 having projecting portions 17 which engage the ends of the wedges or blocks 14, such ends being made to project slightly beyond the outside of the leg 6 of the channel 4 for this purpose. The keepers 16 are internally threaded and screw upon the external threads 18 of the externally and internally threaded nuts 19. The nuts 19 in turn screw upon the threaded ends 20 of bolts 21. The threads on the outsides of the nuts 19 are of opposite pitch from the threads on the ends of the bolts, so that the rotation of the nuts will cause the same to screw upon the bolts 21 and at the same time will cause the keepers to travel along the nuts, thus producing an accelerated movement of the keepers. The advantages of this arrangement are fully set forth in my application above referred to. As the wheel has no wooden felly, it is impracticable to use a bolt passing transversely through the felly of the wheel, as shown in my said application, and I therefore flatten the shank of the bolt as indicated at 22 and secure the same to the underside of the channel 4 by welding, by means of rivets 23, or in any other suitable manner. This construction is particularly applicable to wire wheels, or other wheels having metallic fixed rims, although it is clear that bolts of this character may be secured in the manner shown to the familiar wood-and-metal construction of wheel. The flattened portions 22 of the bolts are preferably provided with lugs 24 which project beyond the side of the fixed rim and form stops to engage the shoulders 25 projecting from the keepers 16. The engagement of these lugs and shoulders limits the movement of the keepers when rotated to inoperative position, as indicated in Fig. 5. Figs. 1, 2 and 4 show the keepers moved to operative position. Upon the rotation of the nuts 19 the keepers will first be drawn laterally away from the fixed rim by the combined action of the screw threads on the nuts and on the ends of the bolts until the keepers are free to rotate. The keepers will then turn with the nuts until they are in inverted and inoperative position, where they will be stopped by the engagement of the shoulders 25 with the lugs 24. When the keepers screw against the heads of the nuts 19, as shown in Fig. 5, the further rotation of the nuts will be stopped. The keepers are now in inoperative position and the rim is free to be removed.

In order to keep the nuts from turning freely and thus to hold the keepers in inoperative position, I preferably insert in the sockets in the nuts, and bearing against the ends of the bolts, small friction springs 70. The engagement of the keepers with the heads of the nuts is sufficient to prevent the accidental rotation of the keepers on the nuts.

When the rim is to be clamped upon the wheel the nuts 19 are rotated in the opposite direction, which will cause the keepers to swing through a half revolution into operative position, where they will be stopped by the engagement of their straight sides 26 with the sides of the lugs 24. Further rotation of the nuts will cause the keepers to screw inwardly, the engagement of the projecting portions 17 thereof with the ends of the blocks or wedges 14 forcing the rim laterally upon the wheel and clamping the same upon the bearing surfaces thereof, as already described.

All but one of the locking devices for securing the rim to the wheel are preferably constructed as above described. The remaining locking device may be modified slightly so that it may be utilized to start the rim laterally off the wheel as well as to force it thereupon. For this purpose I provide the rim with a suitable projection to be engaged by a portion of the keeper when the same is screwed away from the wheel, whereby the keeper will draw the rim laterally off of the wheel at least to an extent sufficient to break any rust which may have formed between the rim and wheel and thus loosen the rim so that it may be freely removed by hand. As shown in Fig. 3, I provide one of the wedges 14 with a projection 30 carrying a downwardly extending lug 31. 32 is a keeper which is in general similar to the keepers 16 above described, but which has a projection 33 preferably somewhat longer than the projections 17 of the keepers 16. The projection 33 serves to force the wedge 14 into engagement with the wedge or block 13, just as the projections 17 of the keepers 16 act, and it also engages the lug 31, when the keeper is moved away from the fixed rim, and thus draws the rim laterally off of the wheel. The keeper 32 preferably has no shoulder 25 as it is desirable that greater freedom of movement be permitted to facilitate its proper manipulation. The keeper is mounted upon an internally and externally threaded nut 19 which is carried by a bolt 21, as already described. The keeper 32 and the block or wedge provided with the lug 31 are preferably located diametrically opposite to the valve stem, as shown in Fig. 1, or as near to that position as is practicable, as the side of the rim opposite to the valve stem is necessarily removed from the wheel first so as to permit the valve stem to be lifted out of the hole through the fixed rim.

In Figs. 6 to 9, inclusive, I have illustrated a modified form of my invention, in which 40 is a wooden wheel of usual construction having a felly 41 upon which is shrunk or otherwise suitably secured a channel-shaped felly band 42. In this modification I have shown the channel 42 provided with legs 43 and 44 of equal height, although it will be understood that they can be made of unequal height, as shown in Figs. 2 and 3, if desired. Secured in the channel at intervals are the blocks or wedges 45. In the present modification four equally spaced blocks are used, although obviously this number may be varied. The front leg 44 of the channel is notched opposite to these blocks, as indicated at 46 in Fig. 9. 47 is the tire-carrying rim which I have shown for purposes of illustration as comprising the endless rim base 48 provided with one endless reversible tire-retaining flange 49 and one transversely split reversible tire-retaining flange 50, the latter having a base 51 seated in a channel 52 formed at the side of the rim base 48. The flange 50 may be locked in position in any suitable manner, as by means of the well-known form of locking device illustrated diagrammatically at 53 in Fig. 6. The rim base 48 has secured to its underside blocks or wedges 54 adapted to engage the blocks or wedges 45 secured in the channel 42. The blocks 45 and 54 are preferably provided with interlocking wedging faces, so that when wedged into engagement they positively prevent creeping of the rim upon the wheel. For example, as shown, the blocks 45 have concave faces which are engaged by the convex faces of the blocks 54. The rim is forced laterally upon the wheel, causing the blocks 54 to wedge upon the blocks 45, by any suitable means, such as by the keepers 55 which screw upon the externally and internally threaded nuts 56. The latter screw upon the projecting threaded ends 57 of the bolts 58. The bolts are provided with heads 59. The shanks of the bolts pass through holes in the felly 41 and screw through threaded openings in nuts or washers 60 which are thus drawn against the side of the felly. The bolts and washers are thus both firmly fixed in position. The washers 60 may be further secured by means of screws 61, as shown in Fig. 9. This general form of locking device is described and claimed broadly in my application Serial Number 586,680, and the modification here illustrated is claimed in my application Serial Number 628,387. It will be understood that other forms of locking devices may be used if desired. The keepers 55 are provided with projections 62 which engage the ends of the blocks 54, such ends projecting through the notches 46 in the channel leg 44. The washers 60 are provided with outwardly extending lugs 63 which are adapted to engage shoulders 64 formed upon the keepers 55 to limit their rotary movement when they are rotated to inoperative position. The operation of this form of locking device is fully set forth in my applications referred to and need not be described in detail. It is substantially the same as that of the locking devices illustrated in Figs. 1 to 5 and already described herein.

In order to start the rim from the wheel and break any rust which may have formed, I construct one of the locking devices in such a way as to engage a portion of the rim when the locking device is unscrewed. Such construction is shown in Fig. 8. In that figure the internally and externally threaded nut 56 carries a keeper 65 which has a large projection 66 adapted to engage the block or wedge 54 when the keeper is screwed up and also adapted when the keeper is drawn away from the wheel felly to engage the wall 67 of the channel 52 and thus draw the rim laterally from the wheel.

From the foregoing description it will be seen that by my invention I provide a rim structure in which, by the use of spaced wedging surfaces upon the two members, the rim is clamped to the wheel by the action of the locking devices in forcing the rim laterally upon the wheel. The action of the coacting wedging faces is to draw the rim down upon the bearing surfaces of the wheel throughout the greater portion of the circumference of the wheel, thus adequately supporting the rim at all points. In this regard my invention is different in principle from and greatly superior to certain structures which have heretofore been suggested, in which wedge blocks are used, but in which no support is afforded the rim between adjacent wedge blocks, thus leaving large spaces of the rim entirely unsupported. It will also be seen that I have provided certain improvements in details of construction, some of which are capable of being utilized in connection with other forms of rims than those illustrated. For example, the means for drawing the rim off the wheel by means of the keeper may be utilized in connection with any rim forced laterally upon the wheel. The improved bolt construction, in which the shank of the bolt is flattened and riveted or otherwise secured to the wheel member of the rim structure, may also be utilized with many different kinds of rims.

While I have described in detail certain preferred embodiments of my invention, these are intended to be merely illustrative thereof, and I desire to cover the same broadly. I do not intend to limit myself to the details of construction any further than as specified in certain of the more limited claims hereunto appended.

Having thus described my invention, I claim:

1. The combination of a vehicle wheel having an annular bearing surface and having transversely inclined wedging surfaces located at intervals about its circumference, a tire-carrying rim having transversely inclined wedging surfaces adapted to coact with the wedging surfaces of the wheel, said rim being adapted to seat upon the bearing surface on said wheel between said wedging surfaces, and means for forcing said rim laterally upon said wheel.

2. The combination of a vehicle wheel having annular bearing surfaces at each side thereof and transversely inclined wedging surfaces located at intervals about its circumference, a tire-carrying rim having transversely inclined wedging surfaces adapted to coact with the wedging surfaces on said wheel, said rim being adapted to seat upon the annular bearing surfaces on said rim between successive wedging surfaces, and means for forcing said rim laterally upon said wheel to cause the wedging surfaces on the wheel and rim to coact and lift the rim away from said wheel at intervals, whereby said rim is caused to clamp the bearing surfaces upon said wheel between the wedging surfaces thereof.

3. The combination of a vehicle wheel having annular bearing surfaces of different diameters at the sides thereof, and having transversely inclined wedging surfaces located at intervals about its circumference, a tire-carrying rim having wedging surfaces adapted to coact with the wedging surfaces of said wheel, and having bearing surfaces of different diameters adapted to engage the bearing surfaces of said wheel between successive wedging surfaces, and means for forcing said rim laterally upon said wheel to cause the wedging surfaces upon the wheel and rim to coact, whereby said rim is lifted away from said wheel adjacent to said surfaces and caused to clamp said wheel between successive wedging surfaces.

4. In a vehicle wheel, in combination, a fixed rim member comprising a metallic channel, the peripheries of the legs of which form annular bearing surfaces, blocks secured in said channel at intervals, said blocks having transversely inclined wedging surfaces, a removable rim having blocks secured to its under-surface, said blocks having transversely inclined wedging surfaces adapted to coact with the wedging surfaces of the blocks secured in said channel, said removable rim being adapted to seat upon the bearing surfaces formed by the legs of said channel between successive pairs of blocks, and means for forcing said rim laterally upon said fixed rim to cause the blocks upon the rim to wedge upon the blocks upon the fixed rim.

5. In a vehicle wheel, in combination, a fixed rim comprising a metallic channel, the peripheries of the legs of which form annular bearing surfaces, blocks secured in said channel at intervals, said blocks having transversely inclined wedging surfaces, a removable rim having blocks secured to its under-surface, said blocks having transversely inclined wedging surfaces adapted to coact with the wedging surfaces of the blocks secured in said channel, said removable rim being adapted to seat between successive pairs of blocks upon the bearing surfaces formed by the legs of said channel, and means for forcing said rim laterally upon said fixed rim to cause the blocks upon the removable rim to wedge upon the blocks upon the fixed rim, the wedging surfaces upon the blocks on the removable rim and felly member interlocking to prevent circumferential movement of said removable rim upon said fixed rim.

6. In a vehicle wheel, in combination, a fixed rim comprising a channel having legs of different heights, the peripheries of which form bearing surfaces of different diameters, blocks mounted in said channel at intervals, said blocks having transversely inclined concave wedging surfaces, a tire-carrying rim having blocks secured to its under-surface, said blocks having convex wedging surfaces adapted to coact with the concave wedging surfaces of the blocks in the channel, said tire-carrying rim having annular bearing surfaces of different diameters adapted to engage the bearing surfaces formed on the legs of said channel, and means for forcing said tire-carrying rim laterally upon said fixed rim to cause the blocks thereon to wedge upon the blocks on the fixed rim, whereby the tire-carrying rim is lifted away from the fixed rim adjacent to the blocks and the annular bearing surfaces on the said tire-carrying rim caused to engage the annular bearing surfaces on said fixed rim between successive pairs of blocks.

7. The combination of a vehicle wheel, a tire-carrying rim and means for forcing said rim laterally on and off said wheel comprising a keeper, a retaining bolt member rigidly secured to said wheel, and a rotatable member mounted on said bolt, said keeper being mounted on said rotatable member.

8. The combination of a vehicle wheel, a tire-carrying rim, a retaining member rigidly secured to said wheel comprising, a rotatable member mounted on said retaining member, a keeper in screw-threaded engagement therewith, and a lug member on said rim coacting with said keeper to provide a translatory motion of said rim upon rotation of said rotatable member.

9. In a vehicle wheel, in combination, a fixed rim having bearing surfaces of different diameters at the sides thereof and having transversely inclined wedging surfaces located at intervals thereon, a tire-carrying rim having bearing surfaces adapted to engage the annular bearing surfaces on said fixed rim, the surfaces for engagement with the bearing surface of said fixed rim of less diameter being formed upon annular ribs rolled in the bottom of said tire-carrying rim, blocks secured to the under-side of said tire-carrying rim having wedging surfaces adapted to engage the wedging surfaces on said fixed rim, at least one of said blocks having a downwardly projecting lug formed at the end thereof, and means for securing said tire-carrying rim upon said fixed rim comprising bolts projecting from the wheel, and keepers carried by said bolts and adapted to engage the ends of the blocks on the tire-carrying rim and force it laterally upon the fixed rim, the keeper engaging the end of the block carrying the downwardly projecting lug being shaped to engage said lug when moved away from the side of said wheel and thereby draw said tire-carrying rim laterally off said fixed rim.

10. The combination of a vehicle wheel provided with transversely inclined wedging surfaces located at intervals thereon, a removable rim having transversely inclined wedging surfaces adapted to coact with the wedging surfaces of the wheel, and means adapted, when moved in one direction, to force said rim laterally on said wheel, and when moved in the opposite direction, to draw said rim off said wheel.

11. The combination of a vehicle wheel provided with transversely inclined wedges located at intervals thereon, a removable rim having transversely inclined wedges adapted to coact with the wedge surfaces of the wheel, one of said wedges having a lug projecting therefrom and keepers contacting with said wedges to move said rim in one direction, and one of said keepers contacting with said lug to move said rim in the opposite direction.

JAMES H. WAGENHORST.

Witnesses:
SEWARD DAVIS,
EDMUND QUINCY MOSES.